Patented Aug. 18, 1953

2,649,461

UNITED STATES PATENT OFFICE 2,649,461

5-NITRO-2-THIOPHENECARBOXALDEHYDE OXIME

Edward C. Hermann, Wilmington, Del., assignor to E. I. du Pont de Nemours and Company, Wilmington, Del., a corporation of Delaware No Drawing. Application June 13, 1951, Serial No. 231,431

1 Claim. (Cl. 260—329)

This invention relates to 5-nitro-2-thiophenecarboxaldehyde oxime, a compound represented by the formula

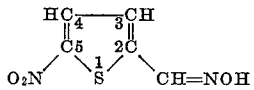

The compound of the invention is prepared by the reaction of hydroxylamine with 5-nitro-2-thiophenecarboxaldehyde.

The preparation of 5-nitro-2-thiophenecarboxaldehyde is fully described and claimed in my copending U. S. application Serial No. 227,117, filed May 8, 1951. In brief, the method comprises reacting 2-thiophenecarboxaldehyde, in the presence of a catalytic amount of a mineral acid, with a lower acid anhydride, preferably acetic anhydride, to produce 2-thiophenemethandiol diacetate, nitrating the diacetate in the presence of acetic anhydride, and finally hydrolyzing the nitrated diacetate to the desired 5-nitro-2-thiophenecarboxaldehyde.

The preparation of the compound of my invention from 5 - nitro-2-thiophenecarboxaldehyde need not be described in detail since the technique of preparing oximes of aldehydes using hydroxylamine is already well known in the art. While I prefer to carry out the reaction between 5 - nitro - 2 - thiophenecarboxaldehyde and hydroxylamine hydrochloride in the presence solely of pyridine and absolute ethanol, one may use in conjunction with hydroxylamine hydrochloride dilute aqueous alkali hydroxide, alkali carbonate, or an alkali bicarbonate.

The following example will illustrate the preparation of 5-nitro-2-thiophenecarboxaldehyde oxime from 5-nitro-2-thiophenecarboxaldehyde. Parts given are by weight.

A mixture consisting of 20 parts of 5-nitro-2-thiophenecarboxaldehyde, 10.4 parts of hydroxylamine hydrochloride, 49.1 parts of pyridine, and 39.5 parts of absolute ethanol was heated for a period of two hours at the temperature at which refluxing of the mixture occurred. The pyridine and ethanol were removed from the system by distillation carried out under reduced pressure. The residue was triturated thoroughly with 50 parts of cold water. The resulting solid product was collected on a filter.

Recrystallization of the crude product from methyl alcohol gave long yellow needles. The needles lightened in color and powdered as the material dried in air. 14 parts of purified 5-nitro-2 - thiophenecarboxaldehyde oxime having a melting point of from 156.5–157.5° C. was obtained.

Anal.: Calcd. for $C_5H_4N_2O_3S$: N, 16.28. Found: N, 16.12.

The oxime of 5-nitro-2-thiophenecarboxaldehyde is useful as a rodenticide; it also has valuable antibacterial activity.

I claim:

5-nitro-2-thiophenecarboxaldehyde oxime.

EDWARD C. HERMANN.

References Cited in the file of this patent

Ex parte Middleton Patent File 2,524,674, page 19—6 pages.

Ward et al., C. A., vol. 43, April–June 1949, Cl. 2669 (e).

Dodd et al., J. Pharmacol. 82, pp. 11–18 (1944).

Alles, J. J. Pharm. and Exp. Ther., vol. 72, p. 265 (1941).

Richter, "Organic Chem.," pp. 649–650, published by Wiley (1938).